(12) United States Patent
Nelson et al.

(10) Patent No.: US 8,186,694 B2
(45) Date of Patent: May 29, 2012

(54) STEERING ASSEMBLIES, VEHICLES INCLUDING A STEERING ASSEMBLIES, AND METHODS OF STEERING A VEHICLE

(76) Inventors: Steven David Nelson, Huntington Beach, CA (US); Erik Steven Nelson, Huntington Beach, CA (US)

( * ) Notice: Subject to any disclaimer, the term of this patent is extended or adjusted under 35 U.S.C. 154(b) by 475 days.

(21) Appl. No.: 12/490,731

(22) Filed: Jun. 24, 2009

(65) Prior Publication Data

US 2010/0327546 A1   Dec. 30, 2010

(51) Int. Cl.
  *A63C 17/01* (2006.01)
  *B62M 1/00* (2010.01)
(52) U.S. Cl. .................. 280/11.28; 280/87.042
(58) Field of Classification Search .......... 280/87.041, 280/87.021, 87.03, 87.042, 11.27, 11.28
See application file for complete search history.

(56) References Cited

U.S. PATENT DOCUMENTS

| | | | |
|---|---|---|---|
| 4,054,297 A | 10/1977 | Solimine | |
| 4,109,925 A * | 8/1978 | Williams et al. | 280/11.28 |
| 4,133,546 A * | 1/1979 | Rosenblum | 280/842 |
| 4,403,784 A * | 9/1983 | Gray | 280/11.28 |
| 4,740,000 A | 4/1988 | Moessner | |
| 5,169,166 A * | 12/1992 | Brooks | 280/87.042 |
| 5,263,725 A * | 11/1993 | Gesmer et al. | 280/11.28 |
| 5,330,214 A * | 7/1994 | Brooks et al. | 280/87.042 |
| 5,853,182 A | 12/1998 | Finkle | |
| 5,868,408 A | 2/1999 | Miller | |
| 5,992,865 A | 11/1999 | Vargas | |
| 6,286,843 B1 * | 9/2001 | Lin | 280/11.28 |
| 6,398,238 B1 * | 6/2002 | Shaw | 280/87.042 |
| 6,419,248 B1 | 7/2002 | Kay | |
| 6,505,845 B1 | 1/2003 | Fong | |
| 6,557,873 B2 | 5/2003 | Nardone | |
| 6,793,224 B2 | 9/2004 | Stratton | |
| 6,938,907 B2 | 9/2005 | Hamy | |
| 2002/0096842 A1 * | 7/2002 | Chang et al. | 280/7.12 |
| 2002/0096846 A1 * | 7/2002 | Chen | 280/87.041 |
| 2004/0100053 A1 * | 5/2004 | Chen | 280/87.041 |
| 2005/0012290 A1 * | 1/2005 | McClain | 280/87.042 |
| 2005/0127629 A1 * | 6/2005 | Nelson et al. | 280/87.042 |
| 2006/0006622 A1 * | 1/2006 | Gesmer et al. | 280/87.042 |

* cited by examiner

*Primary Examiner* — John R Olszewski
(74) *Attorney, Agent, or Firm* — Perkins Coie LLP

(57) ABSTRACT

A vehicle includes a chassis, a suspension system, and a steering system operably coupled to the chassis and to the suspension. The chassis includes a mounting member that has a first elongated slot. The suspension system includes a beam that is pivotally coupled to the mounting member. The steering system includes a first axle, a second axle, a tie bar that extends between first and second tie bar ends, and a slider. The first and second axles are pivotally coupled with respect to the beam. The tie bar is operably coupled to the first and second axles and includes a second elongated slot that is configured to overlie the first elongated slot. The slider is positioned in the first and second elongated slots, and is configured to move in the first and second elongated slots to select a ratio of the tilting of the mounting member to the steering of the first and second axles.

14 Claims, 15 Drawing Sheets

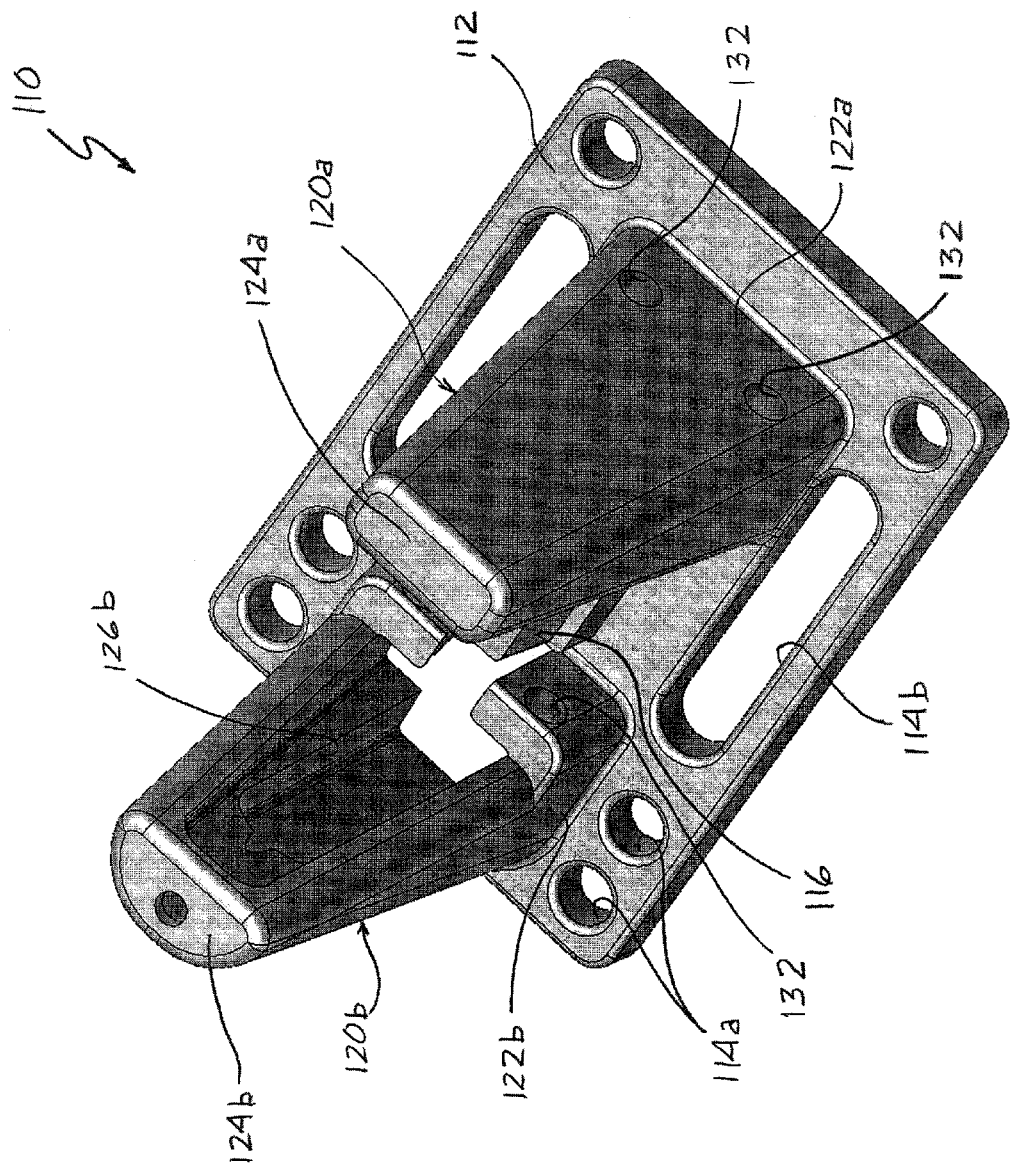

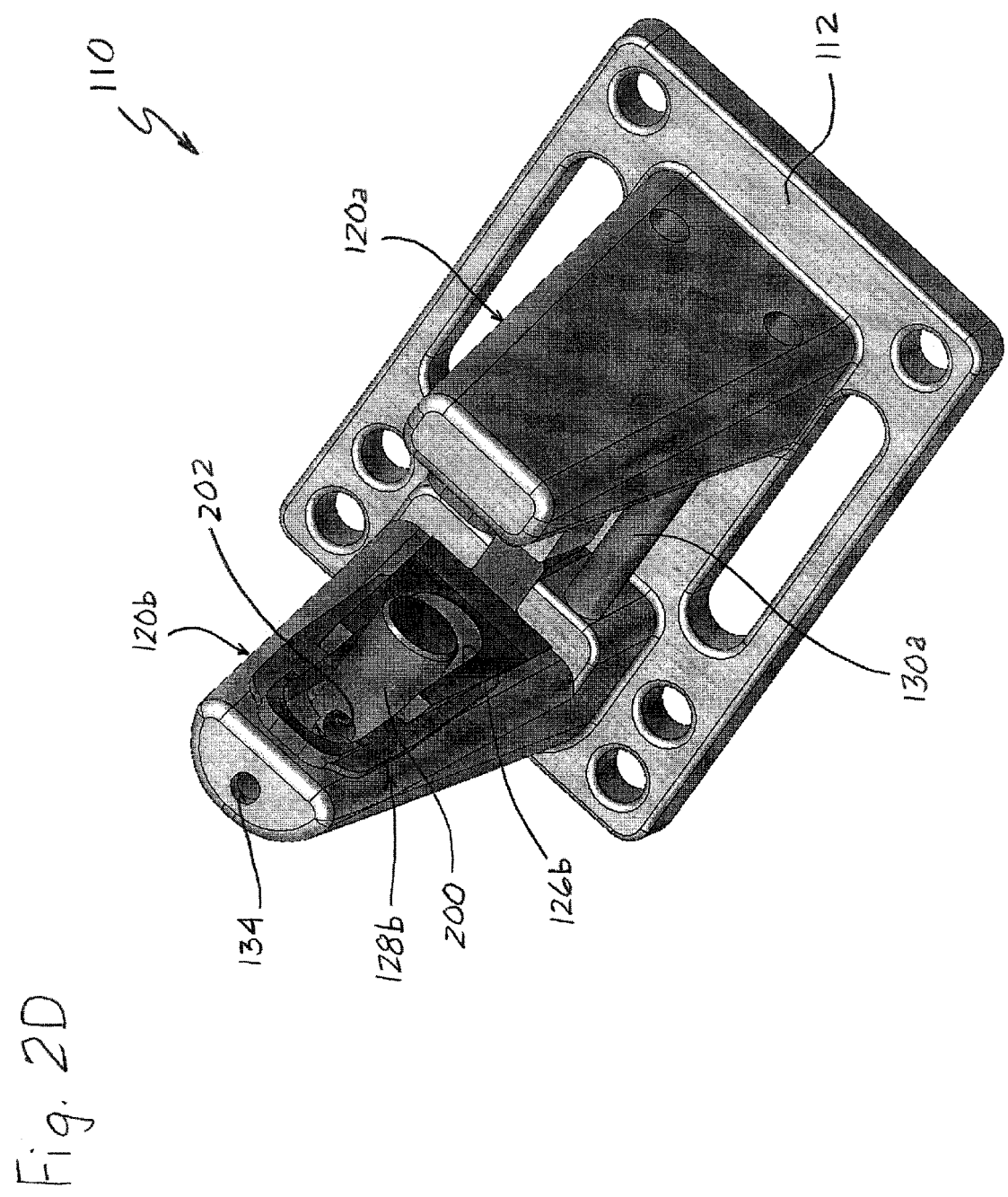

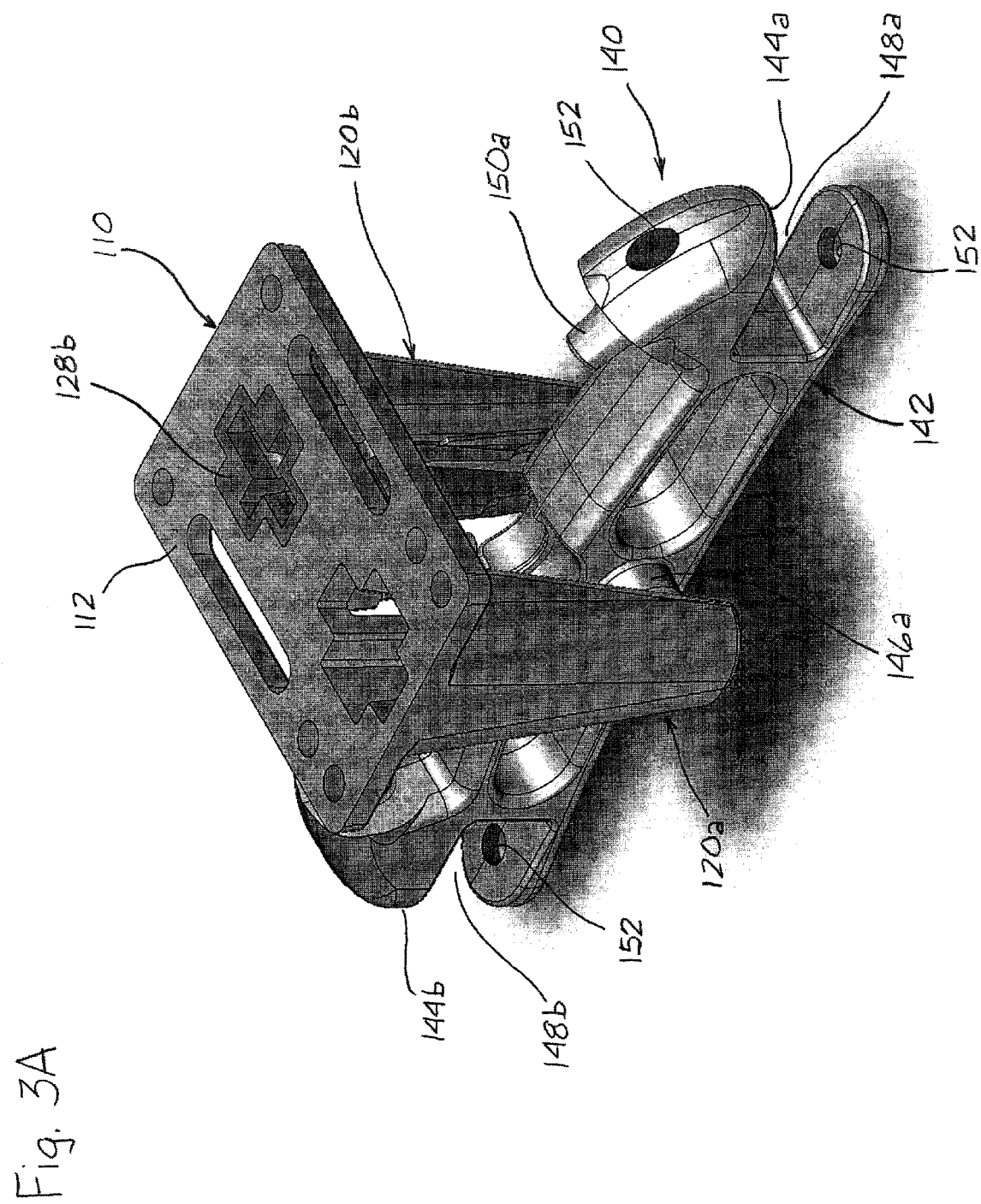

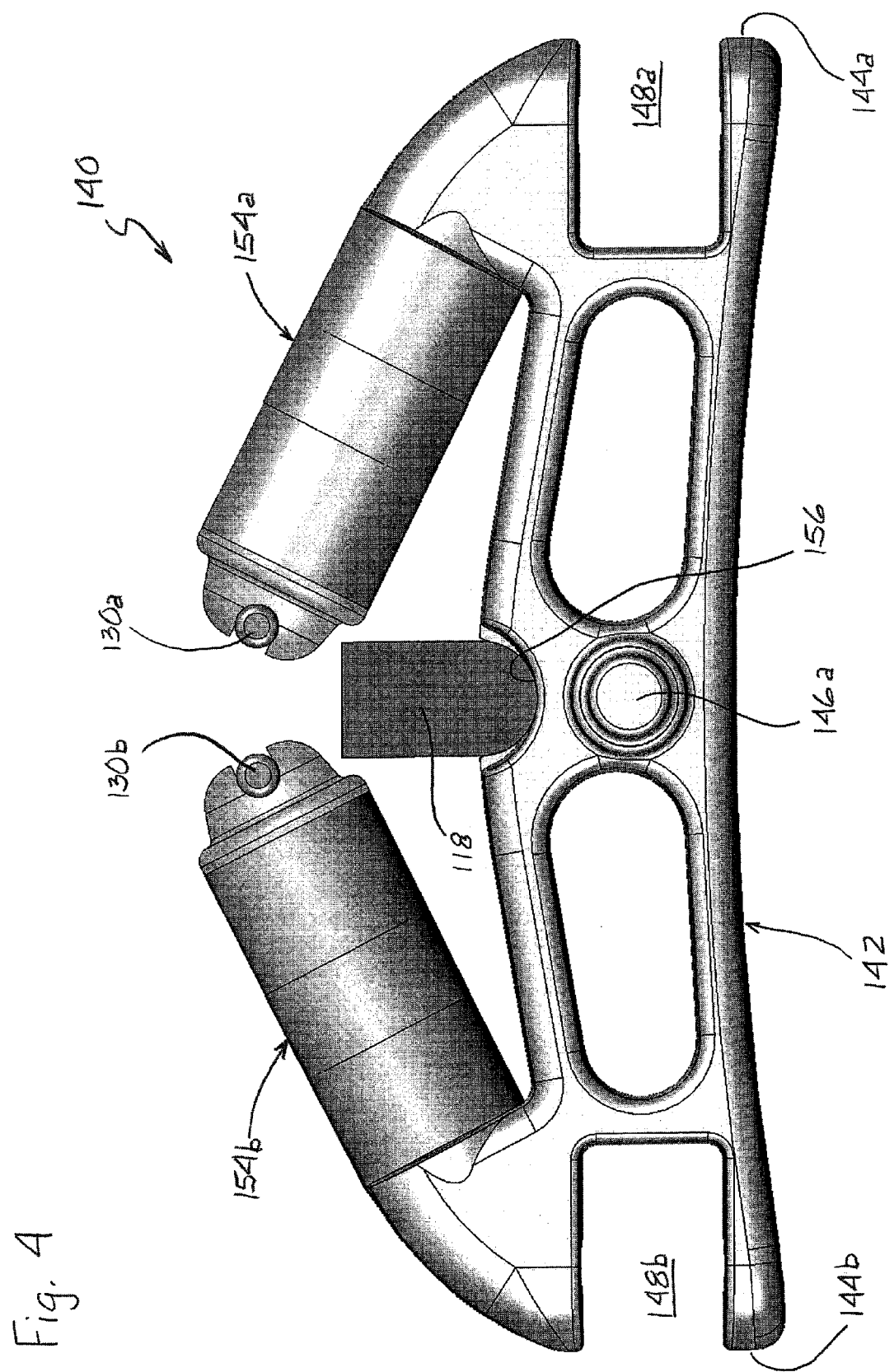

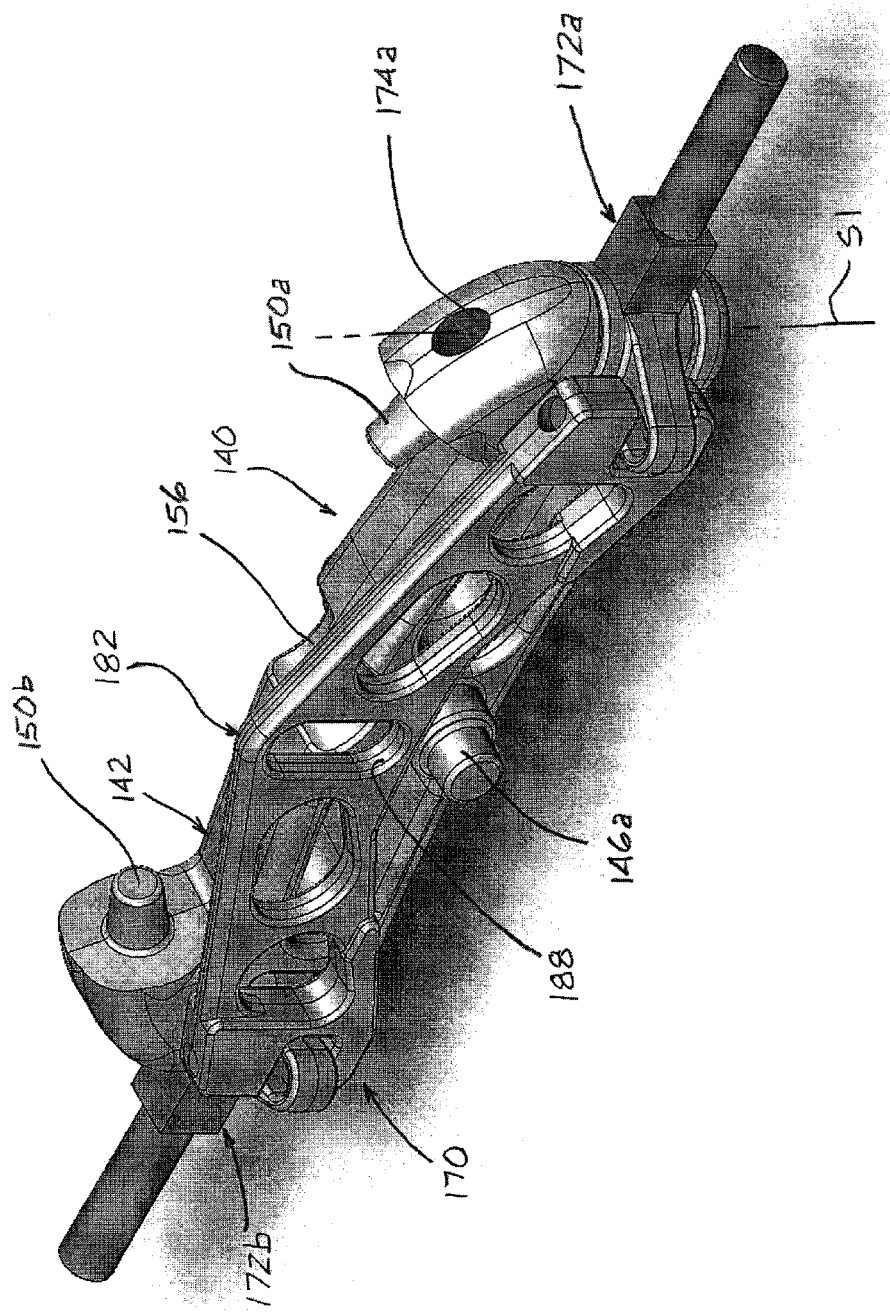

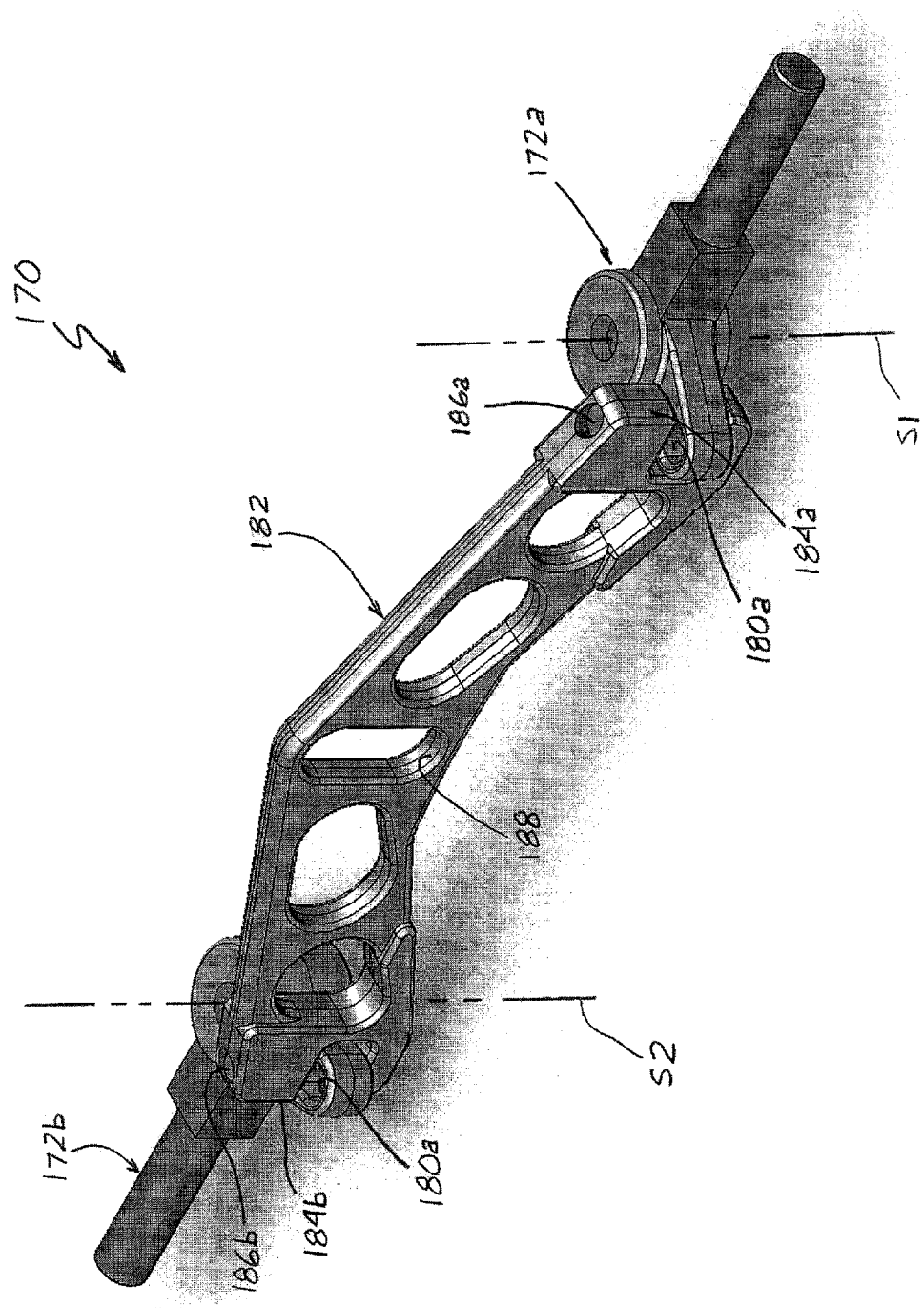

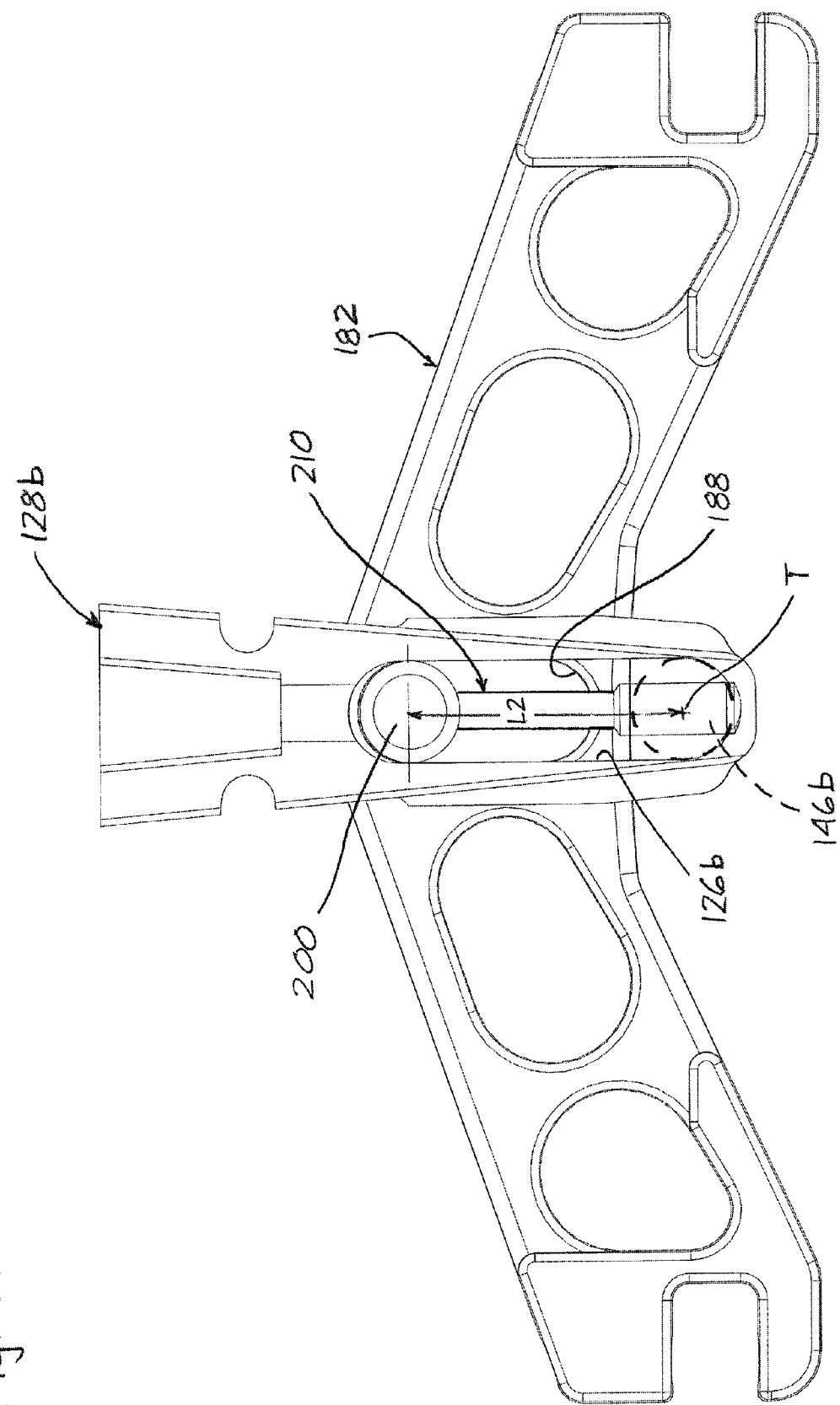

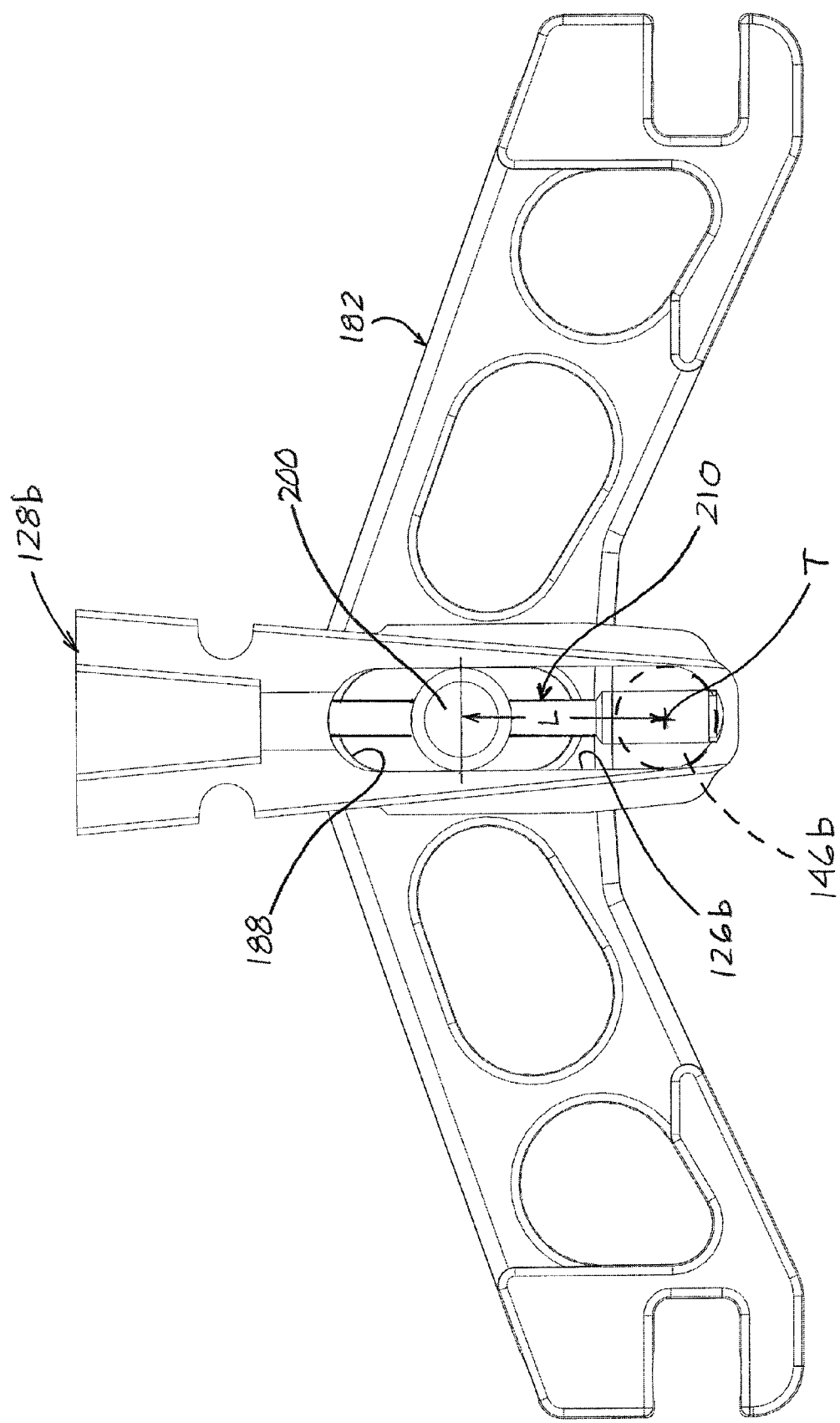

STEERING ASSEMBLIES, VEHICLES INCLUDING A STEERING ASSEMBLIES, AND METHODS OF STEERING A VEHICLE

TECHNICAL FIELD

The present disclosure relates generally to steering devices for skateboards, roller skates, inline skates, street luges and other recreational, professional and commercial vehicles and devices that use a truck type steering apparatus.

BACKGROUND

Conventional skateboards utilize pivoting truck assemblies attached to a solid wood riding deck. These truck assemblies typically include a shaft, cups, elastomeric bushings, washers, mounting plates, a single axle, bearings, two elastomeric wheels and fasteners. The skateboard rider steers the skateboard by leaning and applying pressure to opposite lateral sides of the skateboard deck, which in turn causes the truck assembly to pivot and rotate the single truck axle about a single axis perpendicular to the skateboard deck.

Conventional truck assemblies provide a fairly rugged and reliable assembly, but suffer from a number of disadvantages including: a) the turning ability of existing skateboards is very limited due to existing truck designs and b) existing skateboards have no provision to adjust steering response to the amount of angle and pressure the rider applies to the deck. Existing truck assemblies typically include two wheels attached to a single axle. This arrangement allows only small axle rotation resulting in very limited skateboard turning capability. To execute tight turns, the rider must perform the awkward maneuvers of forcing the back end of the skateboard down which lifts the forward truck assembly off the surface on which it is riding and rotating the skateboard about the rear truck assembly. Less experienced skateboard riders must sometimes stop the skateboard, lift the skateboard off the ground and reposition it in its new direction. This is especially true around very tight turns. While some improvement in skateboard turning capability is possible by changing the truck's elastomeric bushing material and shaft tightness, this improvement typically has the undesirable effect of causing skateboard wobble, wheel "bite" (the wheel hits the deck causing the skateboard to stop rapidly) and instability. Additionally, for every degree of deck rotation the rider applies, a fixed amount of turning radius results. If for instance a rider wants very large changes in steering radii with relatively small changes in initial deck rotation and then smaller changes in steering as more deck rotation is applied, existing skateboards cannot satisfy this need. Existing skateboards provide only a fixed, linear steering output in relation to skateboard rider input.

To overcome the disadvantages of conventional truck assemblies, it is desirable to provide a truck assembly that permits very tight, small turning radius capability without the need to lift the forward truck assembly or the entire skateboard from the surface on which it is riding. Such a truck assembly may maintain stability and eliminate wobble and wheel bite for all truck settings and adjustments. It is also desirable to provide a truck assembly that permits variable and adjustable steering response. Such adjustability may be utilized, for example, to allow small deck rotations to provide large changes in skateboard steering radii or vice verse, i.e., to allow large deck rotations to make small changes in steering radii.

BRIEF DESCRIPTION OF THE DRAWINGS

FIG. 2A is a perspective detail view illustrating the mounting member of the truck shown in FIG. 1B.

FIG. 2D is a perspective detail view illustrating a slider cooperatively engaged in the elongated slot shown in FIGS. 2B and 2C.

FIG. 3A is a perspective detail view illustrating the mounting member and the beam of the truck shown in FIG. 1B.

FIG. 4 is a front detail view illustrating a portion of the suspension system of the truck shown in FIG. 1B.

FIG. 5A is a perspective detail view illustrating portions of the suspension and steering systems of the truck shown in FIG. 1B.

FIG. 5C is a perspective detail view illustrating a portion of the steering system of the truck shown in FIG. 1B.

FIGS. 6A-6C are schematic front views illustrating the variable ratio steering system of the truck shown in FIG. 1B.

DETAILED DESCRIPTION

A. Overview

Figure 1A:
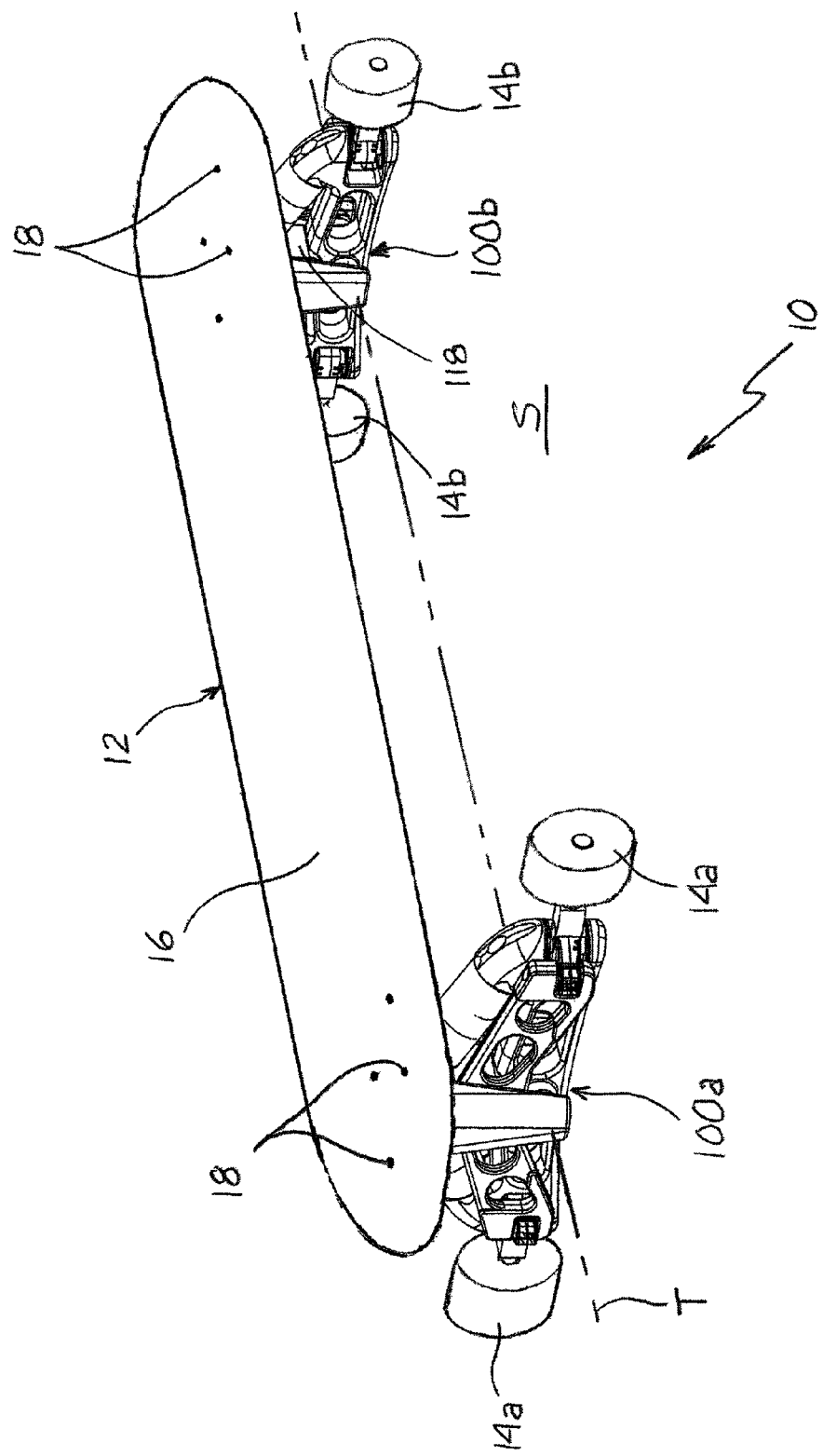
FIG. 1A is a perspective view illustrating a skateboard including a truck according to an embodiment of the present disclosure.

Aspects of the present invention are generally directed toward a vehicle. One aspect of certain embodiments is directed toward a suspension, a chassis operably coupled to the suspension, and a steering system being operably coupled to the chassis and to the suspension. The chassis includes a mounting member configured for tilting with respect to the suspension, and further includes a first elongated slot. The steering system includes a first axle configured for steering a first wheel, a second axle configured for steering a second wheel, and a tie bar operably coupled to the first and second axles. The tie bar includes a second elongated slot configured to overlie the first elongated slot. The steering system also includes a slider being positioned in the first and second elongated slots. The slider adjusts a ratio of the tilting of the mounting member to the steering of the first and second wheels.

Other aspects of the present invention are generally directed toward a skateboard. One aspect of certain embodiments is directed toward a skateboard that includes a deck and a first truck coupling first and second wheels to the deck. The first truck includes a mounting member fixed to the deck, a beam extending between the first and second wheels, and a tie bar steering the first and second wheels. The mounting member is configured for tilting with respect to the beam. The mounting member includes a first elongated slot, and the tie bar includes a second elongated slot configured to overlie the first elongated slot. The first truck also includes a slider positioned in the first and second elongated slots. The slider is configured to move in the first and second elongated slots to adjust a ratio of the tilting of the mounting member to the steering of the first and second wheels.

Still other aspects of the present invention are generally directed toward a truck for coupling wheels to a skateboard.

One aspect of certain embodiments is directed toward a truck that includes a suspension, a mounting member tiltably coupled to the suspension and including a first elongated slot, a first axle pivotally coupled to the suspension, a second axle pivotally coupled to the suspension, and a tie bar being operably coupled to the first and second axles. The tie bar includes a second elongated slot configured to overlie the first elongated slot. The truck also includes a slider positioned in the first and second elongated slots, and an adjuster operably coupling the slider and the mounting member. The adjuster is configured to move the slider in the first and second elongated slots to adjust a ratio of the tilting of the mounting member to the pivoting of the first and second axles.

Yet other aspects of the present invention are generally directed toward a method for steering a vehicle. One aspect of certain embodiments is directed toward a method including tilting a chassis having a mounting member pivotally coupled to a beam, moving a tie bar relative to the beam, and pivoting first and second axles relative to the beam. The mounting member includes a first elongated slot and the tie bar includes a second elongated slot overlying the first elongated slot. The first and second axles are operably coupled to the tie bar. A ratio of moving the tie bar to tilting the chassis is adjusted by positioning a slider in the first and second elongated slots.

Many specific details of certain embodiments of the disclosure are set forth in the following description and in FIGS. 1A-6C to provide a thorough understanding of these embodiments. A person skilled in the art, however, will understand that the disclosure may be practiced without several of these details or additional details can be added to the invention. Well-known structures and functions have not been shown or described in detail to avoid unnecessarily obscuring the description of the embodiments of the disclosure. Where the context permits, singular or plural terms may also include the plural or singular term, respectively. Moreover, unless the word "or" is expressly limited to mean only a single item exclusive from the other items in reference to a list of two or more items, the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

B. Embodiments of Trucks Includinq a Variable Ratio Steering System, Vehicles Using Such Trucks, and Methods for Steering Vehicles Using Such Systems FIG. 1A is a perspective view illustrating a vehicle 10 according to an embodiment of the present disclosure. The vehicle 10 includes a chassis 12 that rides on a plurality of wheels 14 (pairs of wheels 14a and 14b are shown in FIG. 1A), which roll on a surface S. A load (not shown) may be carried on the chassis 12 and may cause the chassis 12 to tilt about a tilt axis T that projects fore and aft of the chassis 12.

The vehicle 10, as shown in FIG. 1A, can be a skateboard. As such, the chassis 12 includes a deck 16 on which a rider (not shown) may stand or otherwise be supported by the chassis 12. The wheels 14 are operably coupled to the deck 16 by trucks 100 (two trucks 100a and 100b are shown in FIG. 1A). The trucks 100 provide spindles upon which the wheels 14 spin as well as steer the wheels 14 relative to the chassis 12 as will be described below.

Vehicles and devices other than skateboards may also use the trucks 100. For example, the trucks 100 may be used on roller skates, inline skates, street luges and other recreational, professional and commercial vehicles and devices that use a truck type steering apparatus.

Figure 1B:
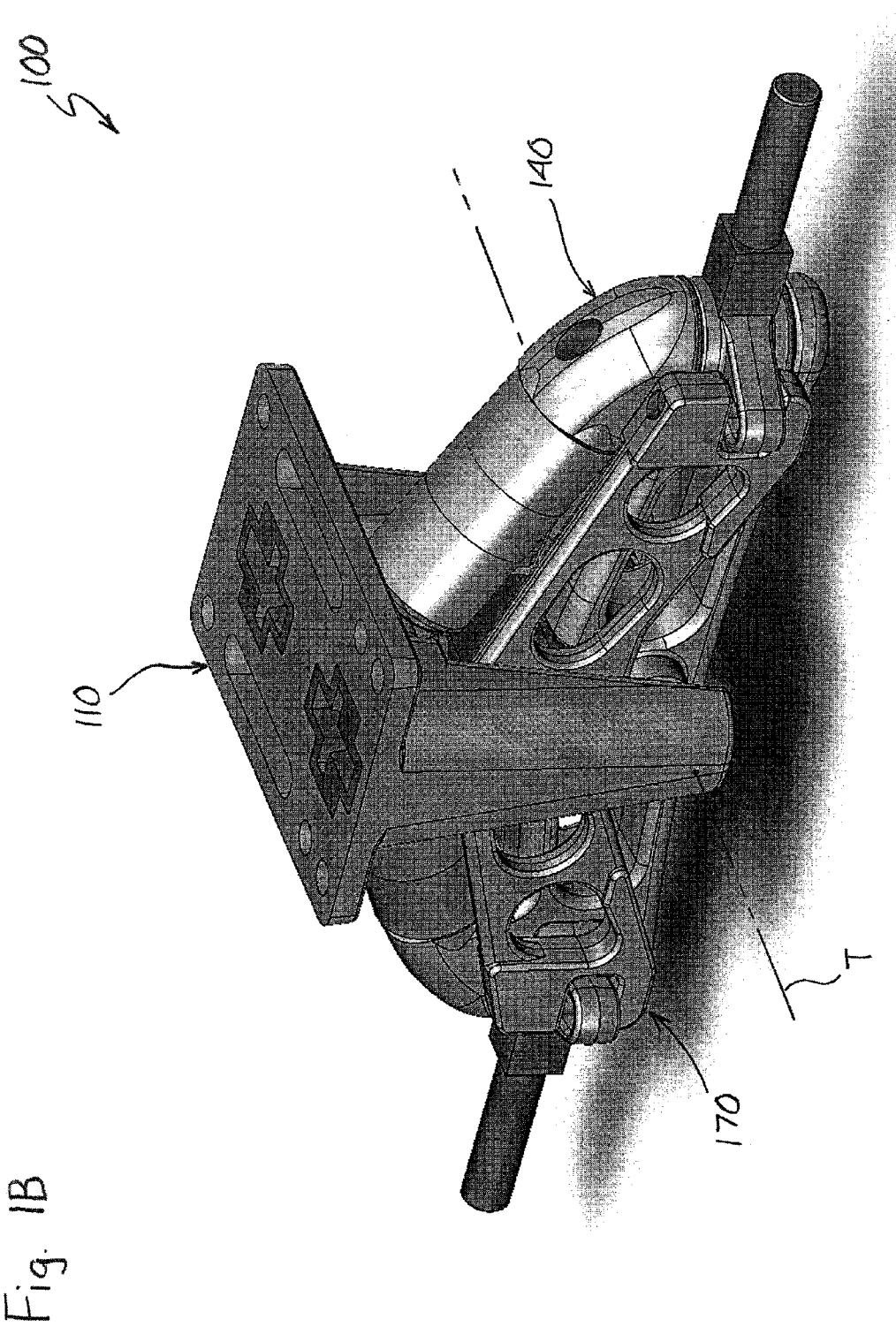
FIG. 1B is a perspective view illustrating the truck shown in FIG. 1A.

FIG. 1B is a perspective view illustrating an embodiment of a truck 100 in accordance with the present disclosure. The truck 100 includes a mounting member 110, a suspension system 140, and a steering system 170. The mounting member 110 forms a portion of the chassis 12 (FIG. 1A), e.g., the mounting member 110 may be fixed to the chassis 12 by one or more fasteners 18 (FIG. 1A). The mounting member 110, accordingly, moves in unison with the chassis 12 including tilting about the tilt axis T.

Figure 2B:
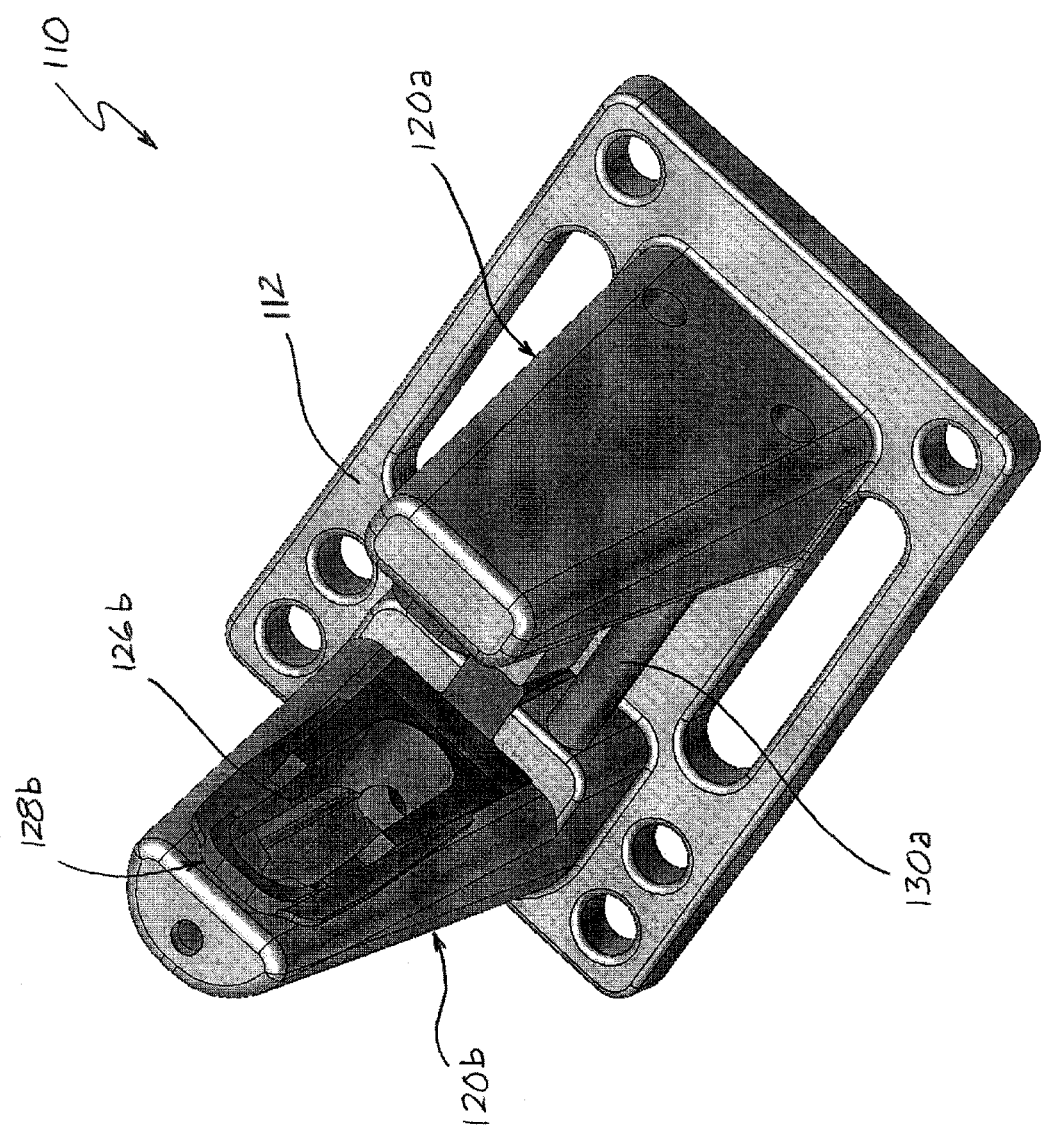
FIGS. 2B and 2C are a perspective detail views illustrating an elongated slot and suspension pick-up points of the mounting member shown in FIG. 2A.

FIGS. 2A-2D illustrate details of the mounting member 110. Referring initially to FIG. 2A, the mounting member 110 includes a flange 112 and arms 120 (shown individually as arms 120a and 120b) that extend from the flange 112. The flange 112 includes apertures 114 such as holes 114a and/or mounting slots 114b. The apertures 114 receive the fasteners 18 (FIG. 1A) for fixing the mounting member 110 to the rest of the chassis 12 (FIG. 1). The size and spacing of the apertures 14 may be selected to conform to one or more standardized mounting arrangements for a vehicle 10 (FIG. 1A). A mounting block 116 maybe formed on the flange 112 between the arms 120 and provide a fixture 116a (FIG. 2C) for securing a bump stop 118 (FIG. 1A) that may limit movement of the suspension 140 (FIG. 1B) toward the flange 112.

The flange 112 and the arms 120 may be integrally formed, e.g., cast, molded, or machined from a homogenous block of material, or the arms 112 may be fastened to the flange 112 to form an integral piece. The arms 120 may extend generally perpendicular to the flange 112, as shown in FIG. 2A, or may extend obliquely with respect to the flange 112. Each arm 120 may have a generally a larger base 122 (shown individually as bases 122a and 122b) proximate to the flange 112 and taper to a tip 124 (shown individually as tips 124a and 124b) that is distal from the flange 112. As shown in FIG. 2A, the arm 120a may have a tapering, generally rectangular cross-section and the arm 120b may have a tapering, generally semi-circular cross-section. The arms 120 may also have different shapes and/or cross-sections than those illustrated in FIG. 2A, e.g., both arms 120 may have non-tapering, semi-circular cross-sections.

Figure 2C:
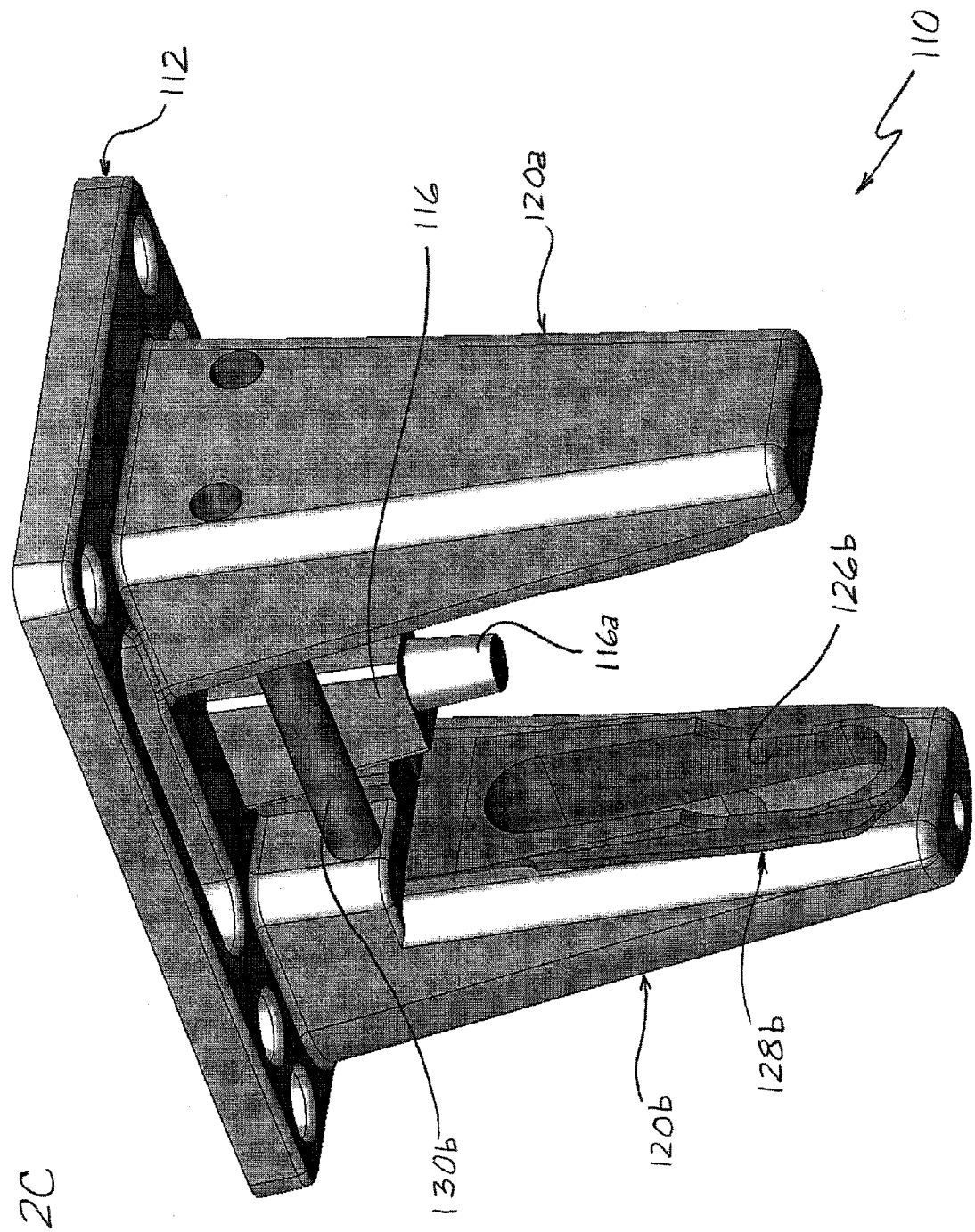

Each arm 120 includes an elongated slot 126 (shown individually as elongated slots 126a and 126b; only elongated slot 126b is shown in FIGS. 2A-2D) that extends lengthwise along the arms 120. Referring additionally to FIGS. 2B and 2C, each arm 120 may include an insert 128 (shown individually as inserts 128a and 126B; only insert 128b is shown in FIGS. 2A-2D) may be positioned in the arms 120 to define the elongated slots 126. Alternatively, the elongated slots 126 may be directly provided by the arms 120. The elongated slots 126 may allow pivoting and/or lengthwise movement of the suspension 140 (FIG. 1B) relative to the arms 120. According to one embodiment, the mounting member 110 may be cast from aluminum and the inserts 128 may be molded from Teflon®. Other lightweight materials that resist deflection may be used for the mounting member 110 and other anti-friction materials that resist compression may be used for the inserts 128.

The mounting member 110 also includes pick-up points 130 (shown individually as pick-up points 130a and 130b) to which the suspension 140 may also be coupled. As shown in FIGS. 2B-2D, the pick-up points 130 may include rods that extend between the arms 120. In particular, rods may be fitted in sets of aligned holes 132 (FIG. 2A) formed in the arms 120. Other arrangements of pick-up points may also be used, including one or more fixtures extending from the mounting block 116.

With particular reference to FIG. 2D, the second arm 120b may additionally include one or more fittings 134 to support a steering ratio adjuster (not shown in FIG. 2D). The fittings 134 according to one embodiment of the present disclosure rotatably support a threaded rod (not shown in FIG. 2D) to displace a slider 200 in the elongated slot 126b, as will be described in additional detail below.

Figure 3B:
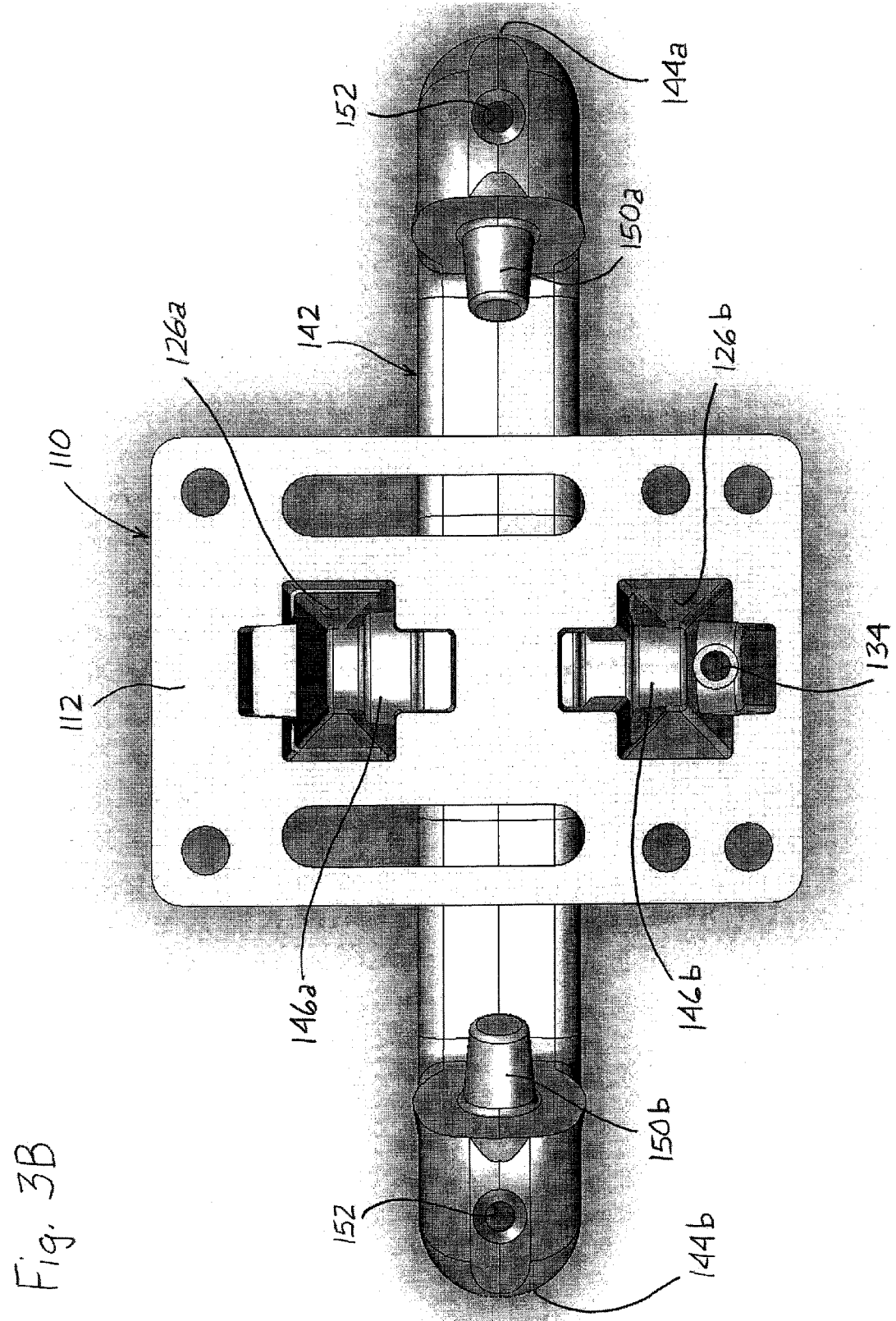
FIG. 3B is a top detail view illustrating the mounting member and the beam of the truck shown in FIG. 1B

FIGS. 3A and 3B illustrate one aspect of an embodiment of an operable coupling between the mounting member 110 and the suspension system 140. The suspension system 140 includes a beam 142 that extends between beam ends 144 (shown individually as beam ends 144a and 144b). Trunnions 146 (shown individually as trunnions 146a and 146b) extend from the beam 142 at approximately at a mid-point between the beam ends 144. The trunnions 146 are pivotally coupled with the elongated slots 126 such that the mounting member 110 and the beam 142 are relatively tiltable about the tilt axis T (FIG. 1A).

Each beam end 144 includes a pocket 148 (shown individually as pockets 148a and 148b) and a post 150 (shown individually as posts 150a and 150b). Each pocket 148 provides a mounting point for the steering system 170 (FIG. 1A) and may include aligned holes 152 through which knuckle pins (not shown in FIGS. 3A and 3B) are inserted. Each post 150 provides a mounting point for a centering member (not shown in FIGS. 3A and 3B).

FIG. 4 illustrates another aspect of an embodiment of the suspension system 140 operably coupled to the mounting member 110 (FIG. 1B). Resilient centering members 154 (shown individually as centering members 154a and 154b) extend between the pick-up points 130 and the posts 150 (FIG. 3B). The centering members 154 may include urethane blocks, coil springs, or suitable other types of resilient elements that tend to bias the mounting member 110 to a centered position, e.g., not-tilted position, with respect to the mounting beam 142. The mounting beam 142 may also include a receiving feature 156, e.g., a recess, to cooperatively engage the bump stop 118 (FIG. 1A). The bump stop 118 may also include urethane blocks, coil springs, or suitable other types of resilient elements that tend to bias apart the mounting member 110 and the mounting beam 142.

The centering members 154 and/or the bump stop 118 may be adjustable or interchangeable. One embodiment according to the present disclosure includes plural sets of centering members 154 that each have different spring rates. Accordingly, a set of centering members 154 may be interchanged with another set of centering members that have a lower spring rate, thereby reducing the force that is required to tilt the chassis 12.

FIG. 5A illustrates one embodiment of an operable coupling between the suspension system 140 and the steering system 170. The steering system includes axles 172 (shown individually as axles 172a and 172b) that are pivotally coupled in the pockets 148 (FIG. 4). Knuckle pins 174 (shown individually as pins 174a and 174b; only knuckle pin 174a is shown in FIG. 5A) are cooperatively fitted in the holes 152 (FIG. 3A) and define steering axes S (shown individually as steering axis S1 and steering axis S2; only steering axis S1 is shown in FIG. 5A) about which the axles 172 may pivot.

Figure 5B:
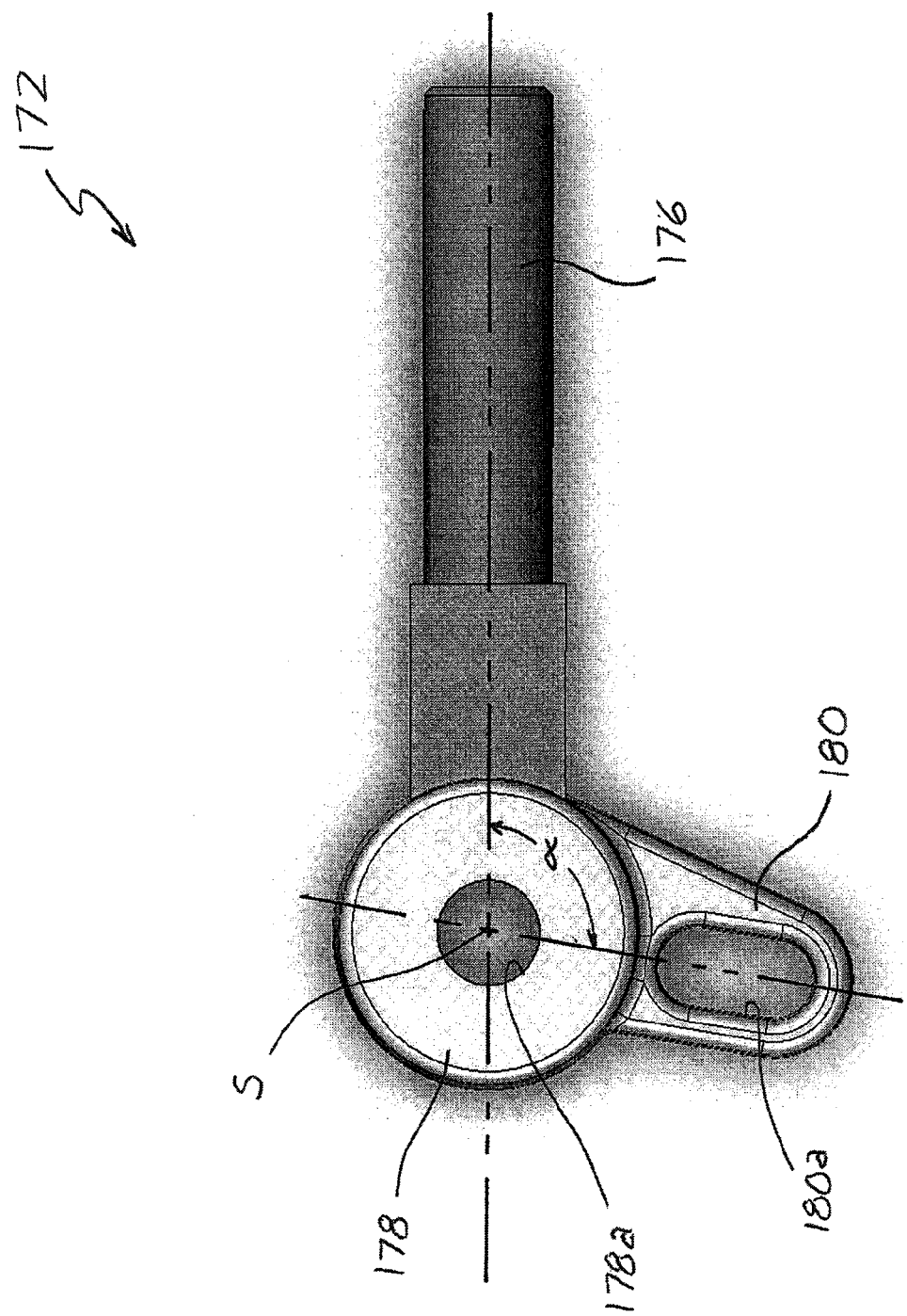
FIG. 5B is a top detail view illustrating an axle of the truck shown in FIG. 1B.

FIG. 5B is a plan view illustrating the axle 172 in accordance with an embodiment of the present disclosure. Each axle 172 includes a spindle 176, a knuckle 178, and a steering link 180. A wheel 14 (not shown in FIG. 5B) is rotatably mounted on the spindle 176. The knuckle 178 fixes the spindle 176 with respect to the steering link 180 and includes a hole 178a that relatively rotatably receives the knuckle pin 174 (FIG. 5A). The steering link 180 includes a steering slot 180a that may extend perpendicularly or obliquely with respect to the spindle 176. According to the embodiment shown in FIG. 5B, the steering link 180 may extend at an obtuse angle α relative to the spindle 176. For example, with angle α in a range of approximately 91° to approximately 105°, or with angle α at approximately 100°, the steering system 170 may have an Ackermann steering geometry such that the steering angles of individual wheels 14 will intersect at the center of a turning circle of the vehicle 10.

Referring additionally to FIG. 5C, the steering system 170 also includes a tie bar 182 that extends between tie bar ends 184 (shown individually as tie bar ends 184a and 1848b). Link pins 186 (shown individually as link pins 186a and 186b) fitted at the tie bar ends 184 extend through the steering slots 180a. The tie bar 184, accordingly, is operably coupled to the axles 172.

The tie bar 182 includes an elongated slot 188 at approximately at a mid-point between the tie bar ends 184. The elongated slot 188 is positioned so as to approximately overlie the elongated slot 126b in the second arm 120b and to also receive the slider 200 (FIG. 2D). The elongated slot 188 may have approximately the same width, but may have a different length as compared to the elongated slot 126b. As the tie bar 182 is moved by the slider 200, the link pins 186 both slide in the steering slots 180a and cause the axles 172 to pivot about the steering axes S. The steering slots 180a allow the tie bar 182 to pivot the axles 172 without the tie bar 182 being moved outside of a plane approximately parallel to the beam 142. According to another embodiment of the present disclosure, holes that rotatably receive the link pins 186 may be substituted for the steering slots 180a and a joint may be included that allows the tie bar 182 to wobble relative to the slider 200.

Figure 6A:
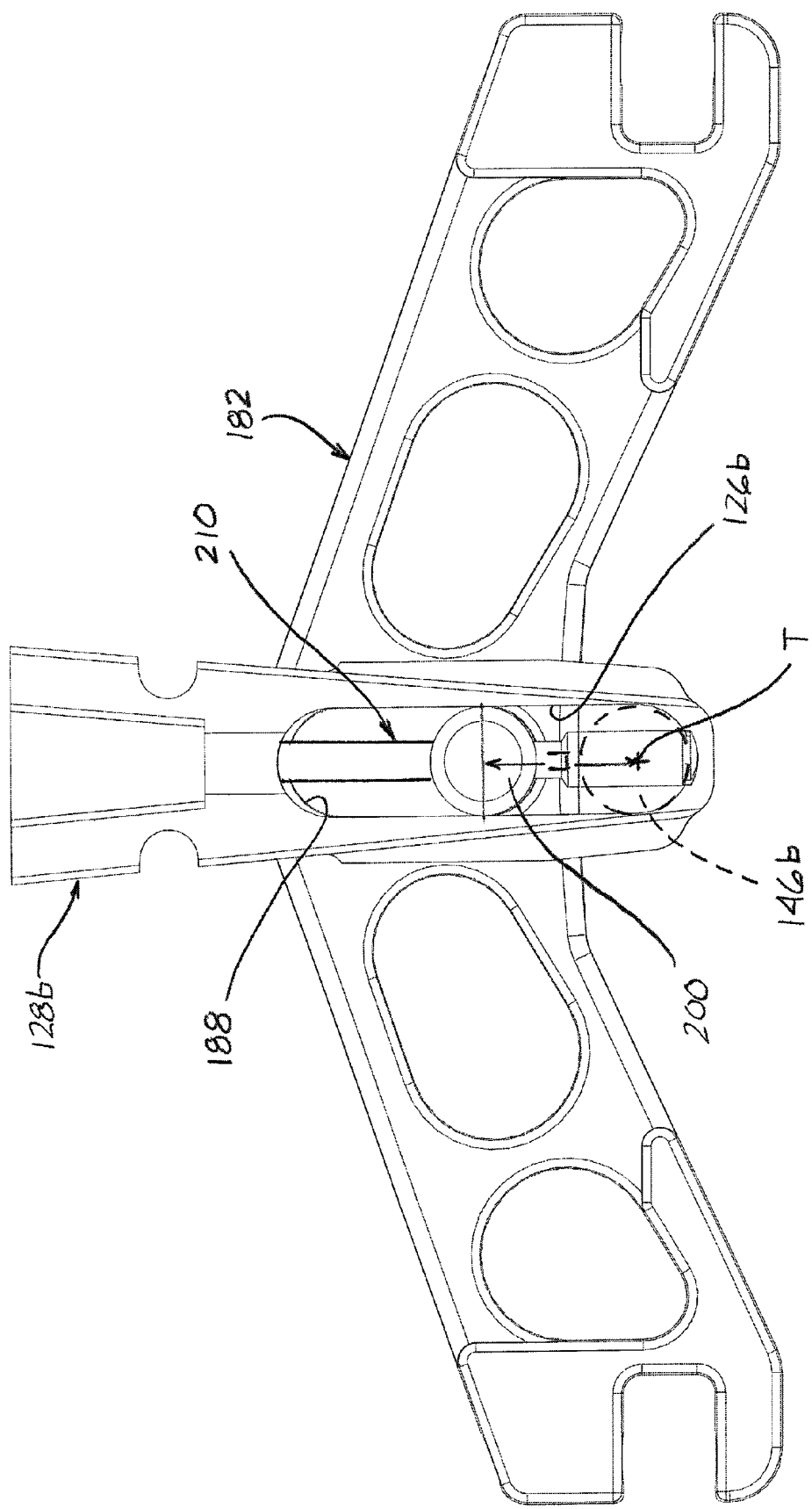

FIGS. 6A-6C are schematic front views illustrating one embodiment according to the present disclosure of a variable ratio aspect of the steering system 170. Portions of the suspension 140, the mounting member 110, and the steering system 170 are not shown for the sake of clarity while explaining the variable ratio aspect of the steering system 170. FIGS. 6A-6C show the insert 128b overlying the tie bar 182 such that the slider 200 extends through and cooperatively engages both the elongated slot 126b in the insert 128b and the elongated slot 188 in the tie bar 182. The trunnion 146b is pivotally received in the end of the elongated slot 126b that is closest to the tip 124b (FIG. 2A).

The steering system 170 also includes a steering ratio 210 adjuster that cooperatively engages the slider 200. One embodiment of a steering ratio adjuster 210 includes a threaded rod that may be rotatably supported by the mounting member 110 (not shown in FIGS. 6A-6C). Accordingly, the slider 200 may include a threaded hole 202 (FIG. 2D) that cooperatively engages the threaded rod. Accordingly, rotating the adjustor 210 relative to the mounting member 110 causes the slider 200 to move along the adjustor 210 and to also move along both elongated slots 126b and 188. According to other embodiments, the slider 200 may be positioned along the elongated slots 126b and 188 by another suitable mechanism or device including a rack and pinion, a track and a latch, a hydraulic cylinder, etc.

Referring initially to FIG. 6A, first steering ratio occurs when the slider 200 is positioned closest to the tilt axis T. As the mounting member 110 and the insert 128b tilt about the tilt axis T on the trunnions 146, the elongated slot 126b will move the slider 200 along an arcuate path about the tilt axis T. In turn, the slider 200 will move the elongated slot 184 and the tie bar 182, which causes the axles 172 (FIG. 5C) to pivot about the steering axes S (FIG. 5C). A first ratio of mounting member tilt to tie bar movement and/or to steering angle is related to a first moment arm length L1 between the tilt axis T and the slider 200.

Referring next to FIG. 6B, a second steering ratio occurs when the slider 200 is positioned furthest from the tilt axis T. A second moment arm length L2 between the tilt axis T and the slider 200 produces a second ratio of mounting member tilt to tie bar movement and/or to steering angle. The second ratio illustrated in FIG. 6B is greater than the first ratio illustrated in FIG. 6A because the slider 200 moves further along the arcuate path. Accordingly, for the same mounting member tilt, there will be greater tie bar movement, a larger steering angle, and the vehicle turning circle is smaller. These characteristics are sometimes referred to as "faster" steering.

Referring to FIG. 6C, the steering ratio may be varied between the first steering ratio (FIG. 6A) and the second steering ratio (FIG. 6B). Using the adjuster 210 to move the slider 200 such that there is a different moment arm length L relative to the tilt axis T varies the steering ratio between the first ratio (FIG. 6A) and the second steering ratio (FIG. 6B). Accordingly, the steering system 170 includes a variable steering ratio that permits slower, less abrupt vehicle turning (FIG. 6A) and faster, tighter vehicle turning (FIG. 6B).

From the foregoing, it will be appreciated that specific embodiments of the disclosure have been described herein for purposes of illustration, but that various modifications can be made without deviating from the spirit and scope of the disclosure. For example, although many of the embodiments are described herein with respect to skateboards, or other types of transportation for a rider, mining carts, hand trucks and other vehicles and devices may be within the scope of the disclosure. Moreover, specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, embodiments of the disclosure are not limited except as by the appended claims.

We claim:

1. A vehicle, comprising:
   a suspension;
   a chassis operably coupled to the suspension and including a mounting member configured for tilting with respect to the suspension, the mounting member further including a first elongated slot; and
   a steering system being operably coupled to the mounting member and to the suspension, the steering system including—
   a first axle configured for steering a first wheel;
   a second axle configured for steering a second wheel;
   a tie bar operably coupled to the first and second axles, and the tie bar including a second elongated slot configured to align with the first elongated slot; and
   a slider being attached with the first elongated slot of the mounting member and sliding within the second elongated slots of the tie bar, wherein tilting of the mounting member causes the slider to slide within the second elongated slot, thus causing the tie bar to reposition the first and second axles.

2. The vehicle of claim 1 wherein the chassis includes a skateboard deck fixed to the mounting member.

3. The vehicle of claim 1 wherein the suspension comprises a beam extending between first and second beam ends, the beam is pivotally coupled to the mounting member between the first and second beam ends, the first axle is pivotally coupled to the first beam end, and the second axle is pivotally coupled to the second beam end.

4. The vehicle of claim 3 wherein the suspension includes a resilient member extending between the beam and the mounting member.

5. The vehicle of claim 3 wherein the suspension includes first and second resilient members, the first resilient member extends between the first beam end and the mounting member, and the second resilient member extends between the second beam end and the mounting member.

6. The vehicle of claim 5 wherein the suspension system further includes a third resilient member extending from the mounting member toward the beam between the first and second beam ends.

7. The vehicle of claim 1 wherein each of the first and second axles include a spindle, a knuckle, and a link, each spindle is coupled to an individual wheel capable of rotation about the spindle, each knuckle is pivotally coupled to the suspension, and each link is operably coupled to the tie bar.

8. The vehicle of claim 7 wherein each link includes an elongated steering slot and the tie bar includes individual pins extending through a respective elongated steering slot.

9. The vehicle of claim 8 wherein each elongated steering slot extends obliquely relative to its respective spindle.

10. The vehicle of claim 1 wherein the steering system further includes an adjuster operably coupled with the slider and the mounting member, wherein the adjuster is capable of changing the location of the slider with respect to the first elongated slot.

11. The vehicle of claim 10 wherein the adjuster includes a threaded shaft rotatably supported by the mounting member and the slider includes a threaded hole cooperatively engaging the threaded shaft.

12. The vehicle of claim 1, wherein a change of the slider position with respect to the first elongated slot adjusts a ratio of the tilting of the mounting member to the steering of the first and second wheels.

13. A skateboard comprising:
   a deck; and
   a first truck coupling first and second wheels to the deck, the first truck including—
   a beam extending between the first and second wheels;
   a mounting member fixed to the deck and pivotally attached to the beam, wherein the mounting member includes a first elongated slot;
   a tie bar steering the first and second wheels, the tie bar including a second elongated slot configured to align with the first elongated slot; and
   a slider being attached with the first elongated slot and being slidable with respect to the second elongated slots, wherein the slider is configured to move in the first and second elongated slots to adjust a ratio of the tilting of the mounting member to the steering of the first and second wheels.

14. The skateboard of claim 13, further comprising a second truck coupling third and fourth wheels to the deck.

* * * * *